US 6,591,269 B1

(12) United States Patent
Ponnekanti

(10) Patent No.: US 6,591,269 B1
(45) Date of Patent: Jul. 8, 2003

(54) DATABASE SYSTEM WITH METHODOLOGY FOR ONLINE INDEX REBUILD

(75) Inventor: Nagavamsi Ponnekanti, Emeryville, CA (US)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 09/574,662

(22) Filed: May 18, 2000

Related U.S. Application Data

(60) Provisional application No. 60/134,935, filed on May 19, 1999.

(51) Int. Cl.[7] .............................. G06F 17/00; G06F 7/00
(52) U.S. Cl. ...................................................... 707/100
(58) Field of Search .......................... 707/1, 3, 10, 102, 707/100

(56) References Cited

U.S. PATENT DOCUMENTS

| | | | | |
|---|---|---|---|---|
| 4,606,002 A | | 8/1986 | Waisman et al. ............... 707/13 |
| 4,677,550 A | | 6/1987 | Ferguson ........................ 707/3 |
| 4,791,561 A | | 12/1988 | Huber ............................ 707/1 |
| 4,805,099 A | | 2/1989 | Huber .......................... 707/102 |
| 4,947,320 A | | 8/1990 | Crus et al. ................... 707/201 |
| 5,089,952 A | | 2/1992 | Bozman ....................... 710/200 |
| 5,115,392 A | | 5/1992 | Takamoto et al. ........... 709/101 |
| 5,123,104 A | * | 6/1992 | Levine et al. ................... 707/1 |
| 5,163,148 A | | 11/1992 | Walls .......................... 707/204 |
| 5,204,958 A | * | 4/1993 | Cheng et al. ................ 707/102 |
| 5,265,244 A | | 11/1993 | Ghosh et al. ................... 707/1 |
| 5,430,869 A | | 7/1995 | Ishak et al. .................. 707/101 |
| 5,475,837 A | * | 12/1995 | Ishak et al. .................. 707/101 |
| 5,493,728 A | | 2/1996 | Solton et al. ................ 711/113 |
| 5,504,888 A | | 4/1996 | Iwamoto et al. ............ 707/200 |
| 5,555,389 A | | 9/1996 | Satoh et al. ................. 711/100 |
| 5,842,196 A | * | 11/1998 | Agarwal et al. ................ 707/1 |

* cited by examiner

*Primary Examiner*—Greta Robinson
*Assistant Examiner*—Susan Rayyan
(74) *Attorney, Agent, or Firm*—John A. Smart

(57) ABSTRACT

A database system providing an efficient methodology for performing an online rebuild of a B+-tree index is described. From a high-level perspective, the method operates by copying the index rows to newly-allocated pages in the key order so that good space utilization and clustering are achieved. The old pages are deallocated during the process. This approach differs from the previously-published online index rebuild algorithms in two ways. First, it rebuilds multiple leaf pages and then propagates the changes to higher levels. Also, while propagating the leaf level changes to higher levels, level 1 pages (i.e., the level immediately above the leaf level) are reorganized, eliminating the need for a separate pass. The methodology provides high concurrency, does minimal amount of logging, has good performance and does not deadlock with other index operations. Performance study shows that the approach results in significant reduction in logging and CPU time. Also, the approach uses the same concurrency control mechanism as split and shrink operations, which made it attractive for implementation.

67 Claims, 6 Drawing Sheets

DATABASE SYSTEM WITH METHODOLOGY FOR ONLINE INDEX REBUILD

RELATED APPLICATIONS

The present application is related to and claims the benefit of priority of commonly-owned provisional application serial No. 60/134,935, filed May 19, 1999 Expired, and entitled, DATABASE SYSTEM WITH METHODOLOGY FOR ONLINE INDEX REBUILD, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to maintenance and processing of indexes (e.g., B+-tree indexes) in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase Adaptive Server™ database servers. Both Powersoft™ and Sybase Adaptive Server™ (formerly Sybase SQL Server™) are available from Sybase, Inc. of Emeryville, Calif.

For enhancing the speed in which a database stores, retrieves, and presents particular data records, DBMS systems employ one or more database indexes on database tables. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. B-tree variants also exist, including B+-tree and B*-tree variants. In a B+-tree, the search keys are stored twice; each of the search keys is found in some leaf nodes.

Today, B+-trees are one of the main indexing methods used in commercial database systems. B+-tree indexes or similar to B-tree indexes. A primary B+-tree index has data records in the leaf pages while a secondary B+-tree index has only the index keys in the leaf pages, where a key consists of a key value and the row ID (ROWID) of the data record. For an introduction to B-tree structures and general methodology, see, e.g., Comer, D., *The Ubiquitous B-Tree*, Computing Surveys, Vol. 11, No. 2, June 1979, the disclosure of which is hereby incorporated by reference.

Over time, insertion and deletion database operations may cause allocations and deallocations of index pages. As mentioned by Gray et al., most practical implementations of B-trees (e.g., Sybase Adaptive Server Enterprise™) do not merge index nodes upon underflow; see, e.g., Gray, J. et al., *Transaction Processing: Concepts and Techniques*, Morgan Kaufmann Publishers, Inc., 1993, the disclosure of which is hereby incorporated by reference. Index pages may become less than half full causing a drop in the space utilization and also an increase in the number of disk reads required to read the same number of index keys. Further, the index may become "declustered" (i.e., index keys within a key range may not be in contiguous disk space), thereby degrading the performance of range queries. To restore the clustering, users can drop and recreate the index. However, that typically requires holding a shared table lock on the table thereby making the table inaccessible to OLTP transactions, which may not be acceptable. Accordingly, a better solution is sought.

Each day more and more businesses are run from mission-critical systems which store information on server-based SQL database systems, such as Sybase Adaptive Server Enterprise™. As a result, increasingly higher demands are being placed on server-based SQL database systems to provide enterprise-wide decision support. Accordingly, there is much interest in improving the performance of such system, particularly in terms of execution speed and reliability.

SUMMARY OF THE INVENTION

The present invention comprises a Client/Server Database System with improved methodology for performing online rebuild of indexes. In an exemplary embodiment, the system includes one or more Clients (e.g., Terminals or PCs) connected via a Network to a Server. The Server, operating under a server operating system (e.g., UNIX) includes a Database Server System, such as Sybase Adaptive Server. In general operation, Clients store data in and retrieve data from one or more database tables resident on the Server. Each table itself comprises one or more horizontal rows or records divided into columns or fields of information. For enhancing the speed in which the Database Server stores, retrieves, and processes particular data records, the Server maintains one or more database indexes on each table. A database index, which in an exemplary embodiment is maintained as a B-Tree data structure (specifically, B+-tree variant), allows the records of a table to be organized in many different ways, depending on a particular user's needs, with the speed of retrieving any particular data record significantly improved.

Methodology is provided which provides an efficient methodology for performing an online rebuild of a B+-tree index. From a high-level perspective, the method operates by copying the index rows to newly-allocated pages in the key order so that good space utilization and clustering are achieved. The old pages are deallocated during the process. This approach differs from the previously-published online index rebuild algorithms in two ways. First, it rebuilds multiple leaf pages and then propagates the changes to higher levels. Also, while propagating the leaf level changes to higher levels, level 1 pages (i.e., the level immediately above the leaf level) are reorganized, eliminating the need for a separate pass. The methodology provides high concurrency, does minimal amount of logging, has good performance and does not deadlock with other index operations. Performance study shows that the approach results in significant reduction in logging and CPU time. Also, the approach uses the same concurrency control mechanism as split and shrink operations, which made it attractive for implementation.

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment where optimization of index data structures is desirable, including those employed in non-SQL database management environments. The description of the exemplary embodiments which follows is, therefore, for the purpose of illustration and not limitation.

Standalone System Hardware

Figure 1A:
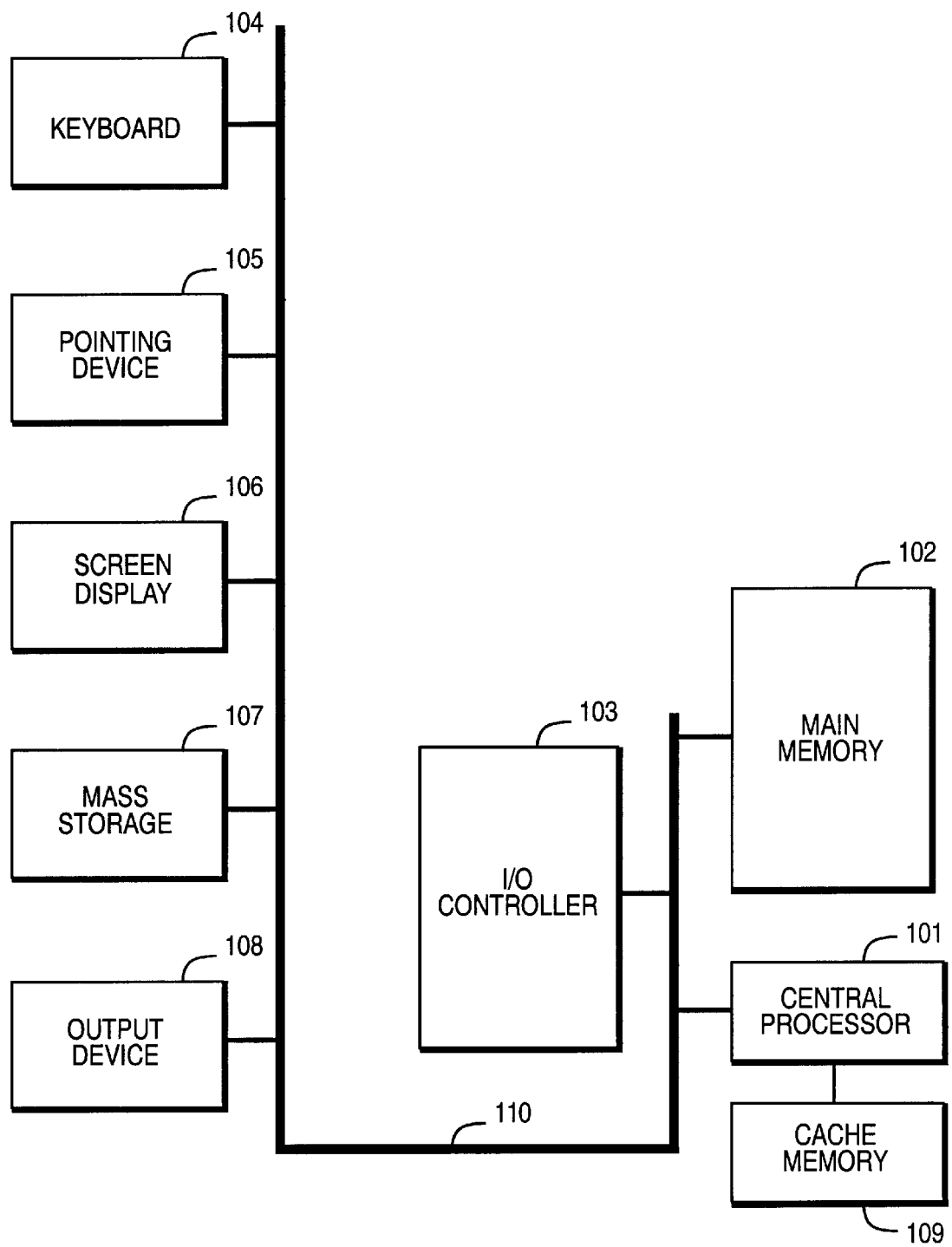
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
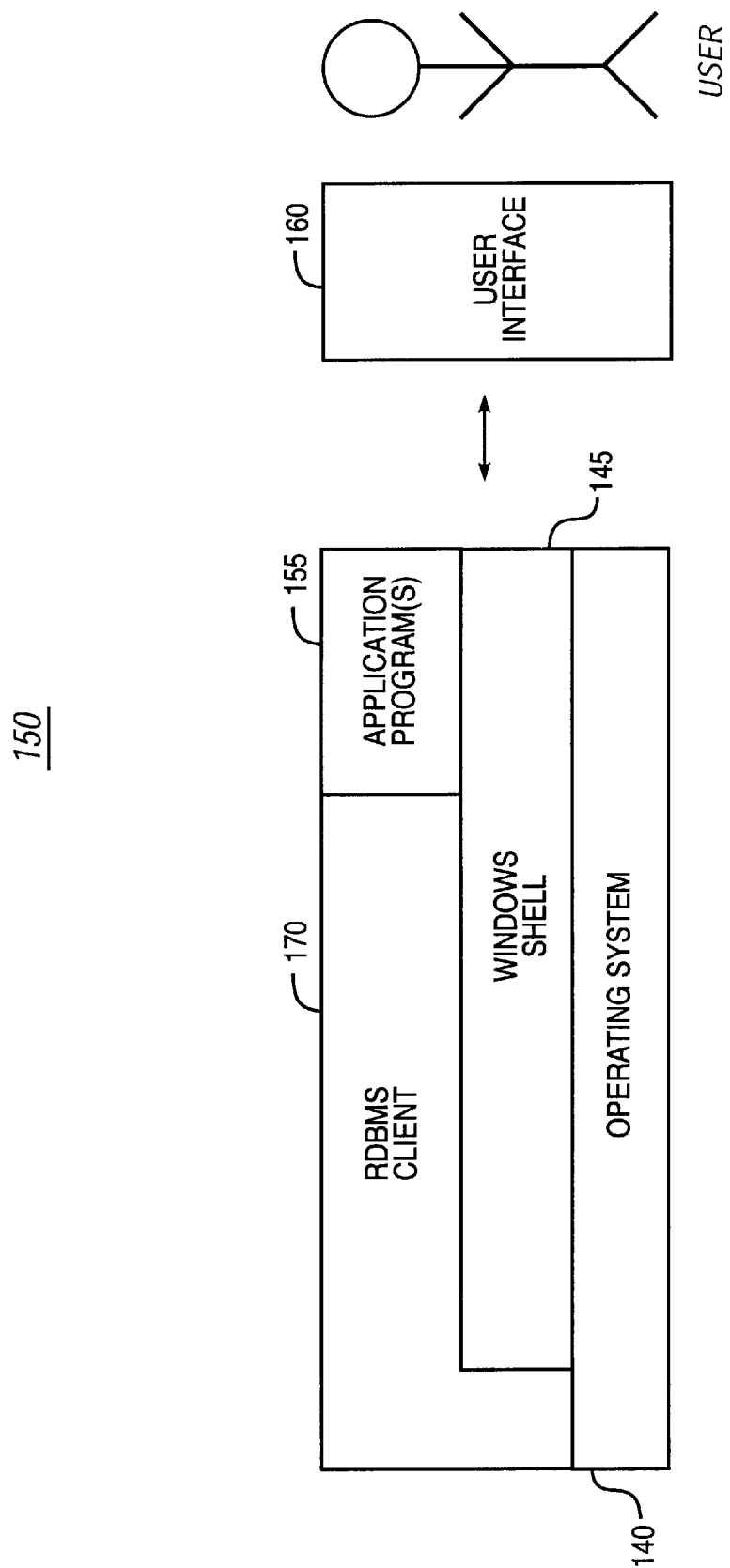
FIG. 1B is a block diagram illustrating a software subsystem for controlling the operation of the computer system of FIG. 1A.

Illustrated in FIG. 1B, a computer software system 150 is provided for directing the operation of the computer system 100. Software system 15 , which is stored in system memory 102 and on mass storage or disk memory 107, includes a kernel or operating system (OS) 140 and a windows shell 145. One or more application programs, such as application software 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170. The RDBMS client 170 may be any one of a number of database front-ends, including PowerBuilder™, dBASE®, Paradox®, Microsoft® Access, or the like. In an exemplary embodiment, the front-end will include SQL access drivers (e.g., Borland SQL Links, Microsoft ODBC drivers, Intersolv ODBC drivers, and the like) for accessing SQL database server tables in a Client/Server environment.

Client/Server Database Management System

Figure 2A:
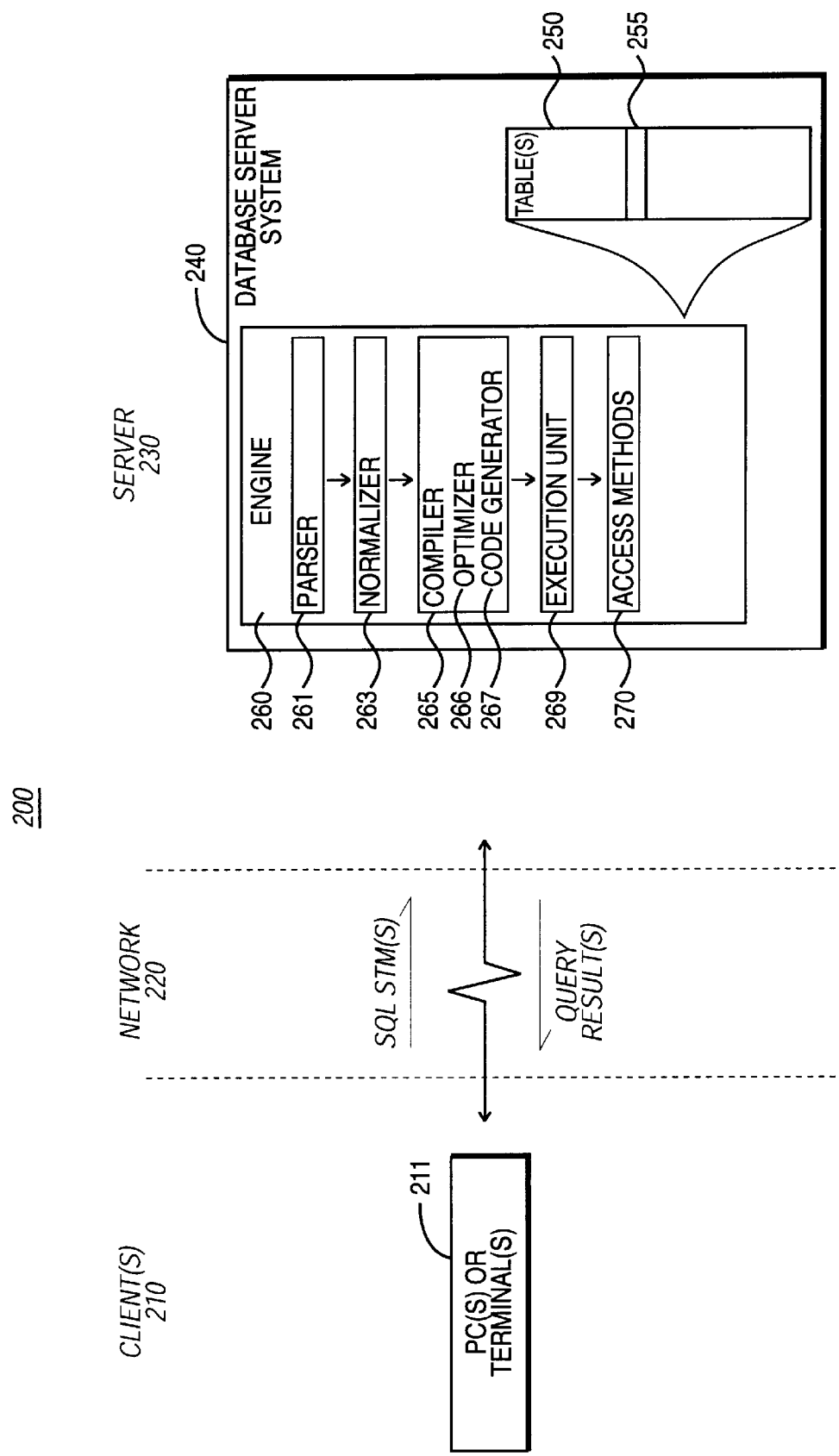
FIG. 2A is a block diagram of a client/server system in which the present invention is preferably embodied.

While the present invention may operate within a single (standalone) computer (e.g., system 100 of FIG. 1A), the present invention is preferably embodied in a multi-user computer system, such as a Client/Server system. FIG. 2A illustrates the general structure of a Client/Server Database System 200 suitable for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240 , which comprises Sybase Adaptive Server™ (formerly, Sybase SQL Server™) (available from Sybase, Inc. of Emeryville, Calif.) in an exemplary embodiment, generally operates as an independent process (i.e., independently of the clients), running under a server operating system such as Microsoft Windows NT (Microsoft Corp. of Redmond, Wash.), NetWare (Novell of Provo, Utah.), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client calls in the well-known SQL (Structured Query Language) together with any parameter information into a format (of one or more packets) suitable for transmission across a cable or wire, for delivery to the Database Server 240.

Client/server environments, database servers, and networks are well documented in the technical, trade, and patent literature. For a discussion of database servers and client/server environments generally and Sybase Adaptive Server™ particularly, see, e.g., Nath, A., *The Guide to SQL Server*, Second Edition, Addison-Wesley Publishing Company, 1995. Additional documentation of Adaptive Server™ is available from Sybase, Inc. as *Adaptive Server Enterprise 11.5 Documentation*(e.g., at //sybooks.sybase.com/cgi-bin/nph-dynaweb/asg1150e). Documentation for Sybase SQL™ Server 11.0.x is available from Sybase, Inc. as Sybase SQL Server 11.0.x Collection (e.g., at //sybooks.sybase.comlcgi-bin/nph-dynaweb/asg1100e). For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/0457 , Intl. Publication No. WO 91/03024, Intl. Publication Date Mar. 7, 1991. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, UT. The disclosures of each of the foregoing are hereby incorporated by reference.

In operation, the Client(s) 210 store data in or retrieve data from one or more database tables 250, shown in FIG. 2A. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Clients issue one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned *An Introduction to Database Systems*. In addition to retrieving the data from Database Server tables, the Clients also include the ability to insert new rows of data records into the table; Clients can also modify and/or delete existing records in the table.

In operation, the SQL statements received from the one or more Clients 210 (via network 220) are processed by Engine 260 of the Database Server System 240. The Engine 260 itself comprises a Parser 261, Normalizer 263, Compiler 265, Execution Unit 269, and Access Methods 270. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods being invoked during query execution.

The Code Generator, on the other hand, converts the query tree into a set of instructions suitable for satisfying the query. These instructions are passed to the Execution Unit 269. Operating under the control of these instructions, the Execution Unit 269 generates calls into lower-level routines, such as the Access Methods 270, for retrieving relevant information (e.g., row 255) from the database table 250. After the plan has been executed by the Execution Unit, the Server returns a query result or answer table back to the Client(s).

For enhancing the speed in which the Database Server stores, retrieves, and processes particular data records, the Server maintains one or more database indexes 245 on the table. A database index, typically maintained as a B-Tree data structure (specifically, B+-tree variant), allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file.

As clients insert more and more data into the table 250, the index 245 continues to grow. Two parts of the Database Server System 240 play a central role in the processing and maintenance of the index: Access Methods 241 and Page Manager 243. For example, the Access Methods include an index manager module which can be viewed as comprising two submodules: B-tree insert and B-tree search. The B-tree search submodule functions to find a particular key value in a tree. All B-tree operations can be viewed as starting with a B-tree search, starting from the root node or page of the B-tree. The B-tree insert submodule serves to insert a new entry into a B-tree. Both employ a B-tree traverse module to traverse a tree. Once the leaf level is reached, if enough space does not exist (e.g., for insertion), then the B-tree split module is invoked for splitting a B-tree page. The splits propagate bottom up; traversal operations, on the other hand, proceed from top to bottom (with care taken to ensure that the two processes do not deadlock).

Indexes and B-Trees

A. B-Trees

Figure 2B:
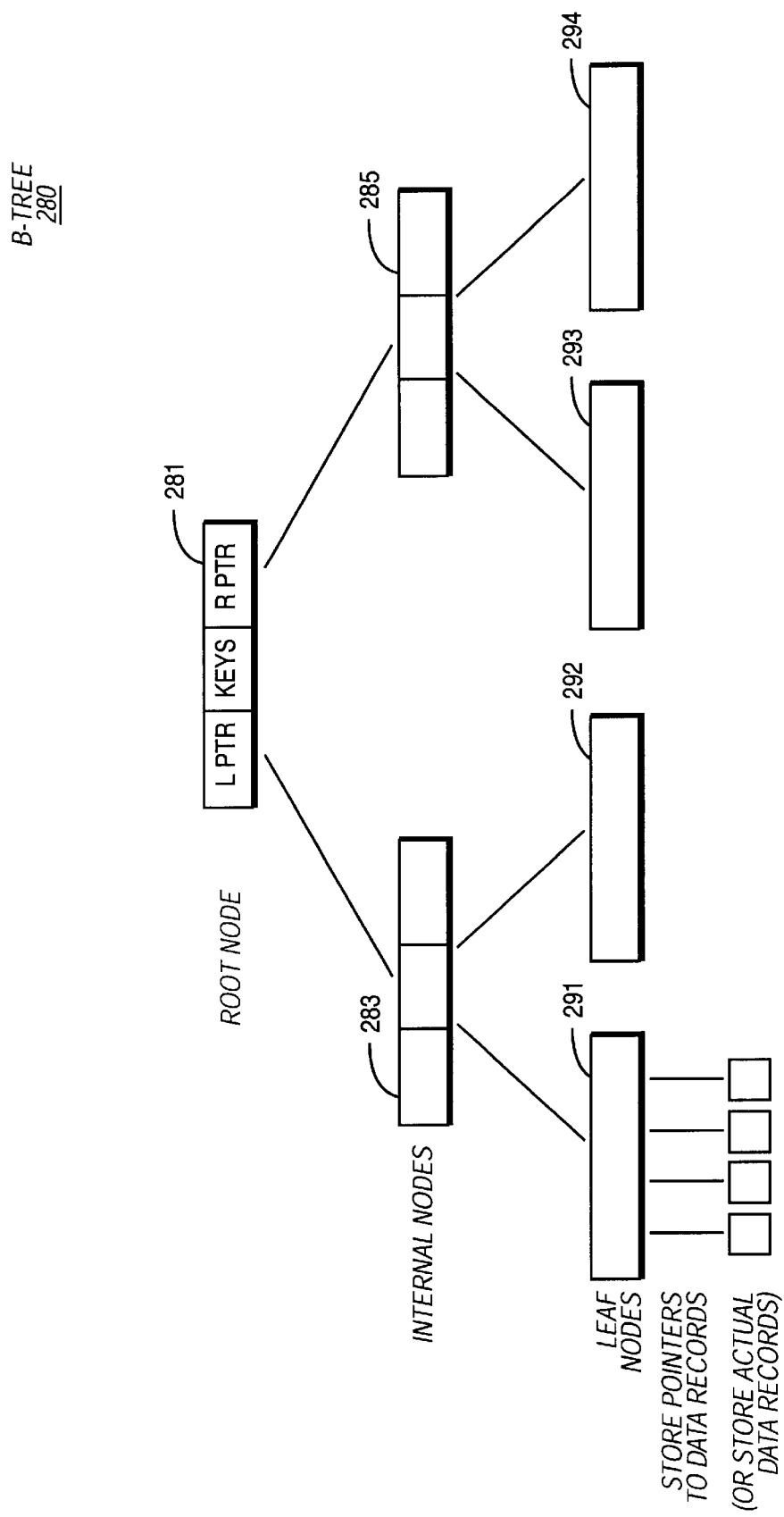
FIG. 2B is a block diagram illustrating general structure of a B-Tree.

B-Trees are fundamental to the maintenance of indexes. FIG. 2B illustrates a simple B-Tree 280, which comprises a Root Node 281, Internal Nodes 283, 285, and Leaf (terminal) Nodes 291, 292, 293, 294. As shown, therefore, a B-Tree consists of a plurality of nodes arranged in a tree. Each node may, in turn, be thought of as a block of records. As shown by the Root Node 281, each node stores one or more key values ("keys") together with pointers to children nodes (e.g., Nodes 283, 285 for Root Node 281).

Searching for a particular record in the B-Tree occurs by traversing a particular path in the tree. To find a record with a particular key value, one would maneuver through the tree comparing key values stored at each node visited with the key value sought. The results of each comparison operation, in conjunction with the pointers stored with each node, indicate which path to take through the tree to reach the record ultimately desired. Ultimately, a search will end at a particular leaf node, such as leaf node 291. The leaf node will, in turn, point to (i.e., store a pointer to or identifier for) a particular data record for the key value sought. Alternatively, the leaf nodes may for "clustered indexes" store the actual data of the data records on the leaf nodes themselves.

In contrast to the B-Tree approach, a sequential or linear scan from the beginning of a database table, comparing each record along the way, is exceedingly slow. There, all of the blocks of records would have to be visited until the record sought is finally located. For a table of even moderate size, such an approach yields unacceptable performance. As a result, virtually all modern-day relational database systems employ B-Tree indexes or a variant.

General techniques for the construction and operation of B-Trees are well documented in the technical, trade, and patent literature. For a general description, see Sedgewick, R., *Algorithms in C*, Addison-Wesley, 1990. For a survey of various B-Tree implementations, see the above-mentioned Comer, D., *The Ubiquitous B-Tree*, Computing Surveys, Vol. 11, No. 2, June 1979, pp. 121–137. For a description of B-Tree indexes implemented in a PC DBMS system, see Baker, M., *B-tree indexing: A look at indexing tradeoffs in dBASE, Clipper, and FoxPro*, Programmer's Journal, Vol. 8.6, November/December 199, pp. 42–46. Also, see System and Methods for Information Retrieval, International Application No. PCT/US91/0726 , International Publication No. WO 92/0644 , Apr. 16, 1992, which describes B-Tree indexes for Fox® PC DBMS software. Multiple index files, including dBASE's .mdx files, have also been described in the technical literature; see e.g., Freeland, R., *Exploring MDXs*, Data Based Advisor, February 1991, pp. 85–87. The disclosures of each of the foregoing references are hereby incorporated by reference.

B. B-Tree Maintenance

Maintenance of B-Trees is fundamental to the operation of indexes in a relational database system. As new data records are loaded in a database table, the index (and corresponding in-memory B-Tree) for that table grows, to accommodate the new records. As a new record is added to a table, a corresponding index entry (typically, index key value plus record identifier) is added to an appropriate slot in the appropriate B-Tree node (i.e., the node which is appropriate for the key value expressed by the record). Since each node of the B-Tree has a fixed size (generally, limited by the size of the database page employed), when an update operation occurs which exceeds the capacity of a particular node, an "overflow" condition exists at the node.

The conventional approach to handling node overflow is generally to split the particular node into equal parts—that is, "down the middle"—for storing the new information (i.e., for storing the additional key value/record identifier for the new data record which is being inserted). Instances where the data record to be inserted (i.e., "insert row") belongs at the end of a page (or node) are treated as a special case, however. In those instances, the conventional approach is to split the page at its end, rather than its middle; this optimizes sequential/batch loading of data which is in sorted order. For data insert operations which are random, the conventional approach yields good, if not optimal, results. An improved approach to handling node overflow which splits the particular node at the point of insertion is described in commonly-owned application Ser. No. 08/497,663, filed Jun. 28, 1995, now U.S. Pat. No. 5,644,763, the disclosure of which is hereby incorporated by reference.

Of particular interest to the present invention is the optimization of database system performance by implementing an improved methodology for online index rebuilds. Modification of the Engine 260 for implementing this methodology will now be described in further detail.

Improved Online Index Rebuilding Methodology

A. Introduction

In accordance with the present invention, an efficient methodology for performing an online rebuild of a B+-tree index is provided. The following discussion will focus on the rebuilding of a secondary index. However, if the primary key value is used as data ROWID in the secondary indices, then the same approach can be used to rebuild a primary index as well. It is assumes that the leaf pages of the index are doubly linked and the non-leaf pages are not linked.

From a high-level perspective, the method operates by copying the index rows to newly-allocated pages in the key order so that good space utilization and clustering are achieved. The old pages are deallocated during the process. This approach differs from previously-published online index rebuild algorithms in two ways. First, it rebuilds multiple leaf pages and then propagates the changes to higher levels. Also, while propagating the leaf level changes to higher levels, level 1 pages (i.e., the level immediately above the leaf level) are reorganized, eliminating the need for a separate pass. This method, which is implemented in the commercial embodiment of Sybase Adaptive Server Enterprise™ (ASE) Version 12.0, available from Sybase, Inc. of Emeryville, Calif., provides high concurrency, does minimal amount of logging, has good performance and does not deadlock with other index operations. Performance study shows that the approach results in significant reduction in logging and CPU time. Also, the approach uses the same concurrency control mechanism as split and shrink operations, which made it attractive for implementation.

B. Index Concurrency Control

1. General

The following describes implementation of concurrency control mechanisms in the index manager. For this discussion, it is assumed that assume row level locking is employed. Insert, delete and scan operations acquire logical locks on rows as needed. Logical locks are meaningful only on rows at the leaf level. Logical locking is not discussed further, as split, shrink, and rebuild operations do not acquire logical locks.

"Latches" are used for physical consistency at the page level. To read or modify a page, an S (shared) or X (exclusive) latch is acquired on the buffer that contains the page. Latch deadlocks are prevented by requesting the latches in top-down order or left-to-right order. An insert may cause a split operation which consists of adding a new leaf page to the chain, possibly moving some keys to it and updating the parent and possibly higher levels. Shrink operation consists of removing a leaf page from the chain and updating parent and possibly higher levels. A page is shrunk when the last row is removed from it. Split and shrink operations are performed as nested top actions (see, e.g., Gray et al. above), which means that once the operation is complete, it is not undone even if the transaction performing it rolls back.

The following presents an overview of insert, delete, split, shrink and scan operations. Pseudocode for tree traversal routine is also presented.

2. Insert and Delete

Insert and delete database operations invoke a traversal module to retrieve the appropriate leaf page X latched. If no split or shrink is needed, the latch is released after performing the insert or delete. Traversal uses the familiar crabbing strategy with latches (see, e.g., Gray et al. above). An S latch is sufficient, except at the leaf level, where an X latch is acquired. However, if a page in the path traversed is undergoing a split or shrink by another transaction, traversal may need to release its latches and block for the split or shrink to complete, as explained in further detail below.

3. Leaf Split

To split a leaf page $P_0$, both $P_0$ and the new page, say $N_0$, are X latched and address-locked in X mode. In addition, SPLIT bits are set on both of them. The X lock acquired by the split is called an address-lock to distinguish it from logical locks. For the discussion which follows, a "lock" refers to an address lock, unless otherwise specified. While the X latches are released soon after the modification of $P_0$ and $N_0$, the X locks and the SPLIT bits are retained until the end of the top action. The purpose of setting the SPLIT bit on a page is to block writes to that page by concurrent transactions after the splitter has released its X latch. (SPLIT bit does not block a writer that just wishes to modify its previous page link. This optimization allows two adjacent leaf pages to be split concurrently.) The writers block by releasing any latches held and requesting an unconditional instant duration S lock on the page. Thus the writers are blocked till the top action is complete. However, readers can still access $P_0$ or $N_0$, if they have successfully acquired an S latch on it. To read or modify a page, an S (shared) or X (exclusive) latch is acquired on the buffer that contains the page. No locks or latches are held on higher level pages by the splitter when it is splitting the leaf page. They are acquired during the propagation phase, as explained below.

The SPLIT bit is similar to the SM bit described by C. Mohan et al.; see, e.g., Mohan, C. et al., *ARIES/IM: An Efficient and High Concurrency Index Management Method using Write-Ahead Logging*, Proc. of ACM SIGMOD Conf, pages 371–380, 1992, the disclosure of which is hereby incorporated by reference. However, SM bit is accompanied with a tree latch (rather than an X lock on the page), which increases the likelihood of blocking. Also, in the present approach, the bit is only an optimization of calls to the lock manager (checking for the bit can be replaced with a request for a conditional instant duration S lock).

4. Propagation of Split to Higher Levels

The split is propagated bottom up. The latches held on the pages at the current level are released before moving to the next higher level. To propagate the split to level i, the split operation calls traversal (operation) to retrieve the appropriate non-leaf page P at level i latched in X mode. (However, traversal may not start from root in this case, as described below.) The page returned by traversal is guaranteed not to have SPLIT (or SHRINK) bit set on it. Here is the action to be taken on P:

(1) If P needs a split, both P and the new page, say N, are X latched, X locked and SPLIT bits are set on them (just as in leaf split). Suppose that keys greater than or equal to K are moved to N. The page P is also marked with OLDPGOFSPLIT bit and entry [K, N] is stored on page P as a side entry 5. Once the side entry is established, both P and N are unlatched and the propagation continues to the next level. In case a concurrent traversal visits page P from its parent before the split propagates to the parent, the traversal uses the side entry to decide which of P or N is the correct target page.

(2) If no split is needed, no X lock or SPLIT bit is needed on P. The insert is performed, and the top action is completed and P is unlatched. The SPLIT bits and the OLDPGOFSPLIT bits are cleared and the X locks are released. Recall that setting SPLIT bit on a page blocks writes to that page but not the reads. Thus a concurrent insert, delete, split or shrink operation that wants to traverse through P (or N) to a lower level page can access P (or N) after splitter has released its X latch on P (or N).

5. Shrink

Shrink is also performed as a nested top action and is propagated quite similar to split operation, except that SHRINK bits are set on the affected pages instead of SPLIT bits. Also, note that setting SHRINK bit on a page blocks both read and write operations on the page.

6. Scan

The scan operation calls traversal module to retrieve the starting page for the scan S latched. The scan qualifies the index keys under S latch. The page is unlatched before returning a qualifying key to query processing layer and is latched again to resume qualification. Also, note that depending on the isolation level, the scan may need to acquire logical locks on qualifying keys.

7. Traversal Pseudocode

The following presents sample pseudocode for traversal. Note that a page is latched in X mode only if it is at the target level and the traversal was called in writer mode. In all other cases, the page is latched in S mode.

```
traverse (searchkey, searchmode, targetlevel)
{
retraverse:
    p = get root page latched;
    while (level of p > target level)
    {
    Search p to identify the child to chase;
    c = get child page latched;
    if (c has SHRINK bit set)
    {
        Unlatch c and p;
        Wait for instant duration S lock on c;
        goto retraverse;
    }
    if (OLDPGOFSPLIT bit is set in c)
    {
        if (searchkey >= key in side entry)
        {
            sibling = Get right sibling latched;
            Unlatch c;
            c = sibling;
        }
    }
    /* Now we are on the correct child */
```

```
        Unlatch p;
        p = c;
    }
    /* Target level is reached */
    if ((searchmode == writermode) and
        (p has SPLIT bit set))
    {
        Unlatch p;
        goto retraverse;
    }
    return p;
}
```

8. Retraversing

In the above approach, "retraversal" starts from the root page. However, the commercial embodiment (ASE) actually uses a more efficient strategy. While traversing down the tree, the pages encountered in the path are remembered. When there is a need to retraverse, rather than starting from the root, it starts from the lowest level page in the path that is safe. A page is safe if it is still at the same level as expected and the search key is within the range of key values on it. The same strategy is used by traversal during the propagation of split and shrink to avoid starting from root. Below, it will be shown that the propagation phase of online index rebuild also uses traversal and benefits from this strategy.

C. Online Index Rebuild Overview

Online rebuild runs as a sequence of transactions, with each transaction performing a series of nested top actions and each top action rebuilding multiple contiguous leaf pages in the page chain. The top actions are called "multipage rebuild" top actions. The number of pages to rebuild in a single top action is denoted by "ntasize" and the number of pages to rebuild in a transaction is denoted by "xactsize". Rebuilding multiple pages in a single top action reduces logging and CPU time. An ntasize of 32 is chosen based on observed performance. The significance of xactsize is explained below.

At the end of each transaction, the new pages generated in the current transaction are flushed to disk and then the old pages that were removed from the tree are made available for fresh allocations. Flushing new pages to disk before making old pages available for fresh allocations allows rebuild not to log full keys during the key copying. Instead, the log records contain only the PAGEIDs and the timestamps of the source page and the target page and just the positions of the first and the last key that were copied. Redo (operation) may have to read the source page to redo the key copying. On the other hand, if the source page is made available for allocation before the target page is flushed to disk, then the new contents of the source page could reach the disk before the target page reaches the disk. If a crash occurs after the new contents of the source page reach the disk, but before the target page reaches the disk, the target page cannot be recovered. While rebuilding several pages in a transaction has the advantage of delaying the forced write of new pages, it also delays the availability of the old pages for reuse. It is desirable to rebuild a few hundred pages in a transaction.

D. Multipage Rebuild Top Action

1. Introduction

Consider the rebuild of contiguous pages $P_1, P_2, \ldots, P_n$ in a single nested top action. Suppose that PP is the previous page of $P_1$. and NP is the next page of $P_n$. The top action involves a copy phase and a propagation phase, which will now be explained in turn.

2. Copy Phase a. General

The index keys are copied from $P_1, P_2, \ldots, P_n$ to PP and zero or more newly allocated pages, say $N_1, N_2, \ldots, N_k$, where k>=0. Note that k could be greater than n (i.e., k>n) if the user has specified that the new leaf pages be filled only up to a desired fill factor, so that some space is left free for future inserts. Copy phase also includes fixing page linkages and deallocating the old pages.

b. Locking

X locks are acquired and SHRINK bits are set on PP, $P_1$, $P_2, \ldots, P_n$ in that order. For i>1, if $P_i$ has the SPLIT or SHRINK bit set on it, rebuild does not wait for lock. Instead, only pages $P_1, P_2, \ldots, P_{i-1}$ are rebuilt in the current top action. On the other hand, if PP or $P_1$ has the SPLIT or SHRINK bit set, then rebuild waits for the split or the shrink to complete.

c. Logging

The copy phase generates a single keycopy log record to capture all the key copying that has occurred from pages $P_1$, $P_2, \ldots, P_n$ to PP and the newly allocated pages. It has multiple entries of the form: [source pageno, target pageno, position of the first key copied, position of the last key copied]. It also generates allocation and deallocation log records and a "changeprevlink" log record for NP.

d. Page Deallocations

A page can be in one of "allocated", "deallocated", or "free" states. Only a page in free state is available for fresh allocations. When the page manager is called to deallocate a page, it logs a deallocation record and takes the page to deallocated state. The page manager is called again to free the page. The transition from deallocated state to free state is not logged by the page manager and it cannot be undone. In the event of a crash, after the redo and undo phases, recovery frees up pages that are still in deallocated state. In the case of a shrink top action, deallocated pages are freed when the top action commits. However, in the case of multipage rebuild topaction, the deallocated pages are freed only when the current transaction commits. It uses log scan to determine what pages need to be freed up. Also, note that if rebuild needs to abort due to lack of resources or internal error or a user interrupt, during rollback, it needs to free up the pages deallocated in completed top actions. Before freeing up the old pages, the new pages need to be flushed to disk.

2. Propagation Phase

The changes are propagated to level 1 by deleting the entries for $P_1, P_2, \ldots, P_n$ and inserting the entries for $N_1$, $N_2, \ldots, N_k$ in the parent(s) of $P_1, P_2, \ldots, P_n$. The propagation may continue above level 1. The propagation of split (shrink) can be thought of as passing of an insert (delete) command from one level to the next. The propagation of rebuild top action can be thought of as passing multiple commands from one level to the next, where each command could be an insert, delete or an update. At each level several pages could be affected. At a given level, the affected pages are modified in left to right order. Also, all modifications at the current level are finished before moving to the next higher level. For each affected non-leaf page, no more than one "batchdelete" log record and one "batchinsert" log record are generated. These log records contain the entire keys that were inserted or deleted. The propagation phase is described in detail below.

3. Advantages of Rebuilding Multiple Pages in a Single Top Action

Insert and delete log records in ASE have not only the key being deleted or inserted but also a lot of additional information such as transaction ID, old and new timestamps for the page, position of delete or insert, and the like. The amount of such additional information is as high as 60 bytes and is amortized by batching multiple inserts or deletes in a single batchinsert or batchdelete log record. Similarly, the overhead in other log records is amortized by rebuilding multiple pages in a single top action. Besides saving log space, it has also been observed that rebuilding multiple pages in a top action reduces the number of visits to level 1 pages significantly, reducing the calls to lock manager, latch manager, and the like.

E. Propagation Phase of Rebuild 5 1. General

The following discussion focuses on how the rebuild of multiple leaf pages is propagated to higher levels. The propagation is bottom up and the modifications to be done at the next higher level are specified in the form of propagation entries. Before describing propagation entries, it is helpful to review what an index entry is. It is assumed that a nonleaf page in the B+-tree that has n child pointers has only n−1 key value separators. An index entry is of the form [key value, child pageid], except for the index entry for the first child, which does not have the key value. An index page having n children has n index entries $C_0$, $[K_1, C_1]$, $[K_2, C_2]$, ..., $[K_{n-1}, C_{n-1}]$. For $0<i<=n-1$, $C_i$ has index entries greater than $K_i$ and for $0<=i<n-1$, $C_i$ has index entries less than $K_{i+1}$. With this understanding, it is now appropriate to define propagation entries and explain what propagation entries are passed from the leaf and the nonleaf pages, as well as described how the propagation phase proceeds from one level to the next.

2. Propagation Entries

A propagation entry specifies the following:
(1) the page P that is sending the propagation entry.
(2) operation that must be performed at the next higher level. The possible operations are DELETE, UPDATE or INSERT of an index entry.
(3) INSERT propagation entry specifies the entry to be inserted at the next level. UPDATE propagation entry specifies the entry to replace the existing entry for that page. UPDATE and DELETE propagation entries do not specify the contents of index entry to delete (pageID uniquely identifies the index entry).

3. Propagation Entries Passed From a Leaf Page

Consider the rebuild of leaf pages $P_1, P_2, \ldots, P_n$ in a single top action. Let PP be the previous page of $P_1$ and NP the next page of $P_n$. The follow represents the rules that determine what propagation entries are passed from a single page $P_i$:

Suppose that k, where k>0, new allocations are needed to accommodate the keys from $P_i$. The entry for $P_i$ needs to be deleted from parent and entries for the k new pages need to be inserted in the parent. So an UPDATE propagation entry followed by k−1 INSERT propagation entries are passed. If all the keys from $P_i$ could be copied into the last newly allocated page (i.e., no new allocation was needed to accommodate the keys from $P_i$), it passes DELETE propagation entry.

Thus, each page that was rebuilt passes one or more propagation entries. All the propagation entries from $P_1$, $P_2$, ..., $P_n$ are accumulated before the propagation proceeds to level 1.

4. Propagation Entries Passed From a Non-leaf Page

A non-leaf page P passes propagation entry(s) in the following cases:
P is becoming empty (in this case P needs to be shrunk)
P is split
P is not becoming empty but there was some key movement from the subtree under P to the subtree under its left sibling.

These three cases are discussed in more detail below. Note that the last two cases are not mutually exclusive.

(a) Shrink of P

If all children pass DELETE propagation entries, then page P needs to be shrunk. In this case, there is no need to perform the deletes. Page can directly be deallocated. It passes DELETE propagation entry. This means that all the leaf rows in the subtree under P have been moved to the subtree under its left sibling.

(b) Split of P

The inserts to be performed on page P (as a result of UPDATE/INSERT propagation entries coming from children of P) may cause P to be split. If so, P is split in such a manner that all the remaining inserts go to the old page or all of them go to the new page. Note that one split may not be sufficient to accommodate all such inserts. If the insertions cause k splits, then k siblings are generated for P and k INSERT propagation entries are setup for inserting entries for these new pages at the next higher level.

(c) Key Movement Across Subtrees

Figure 3:
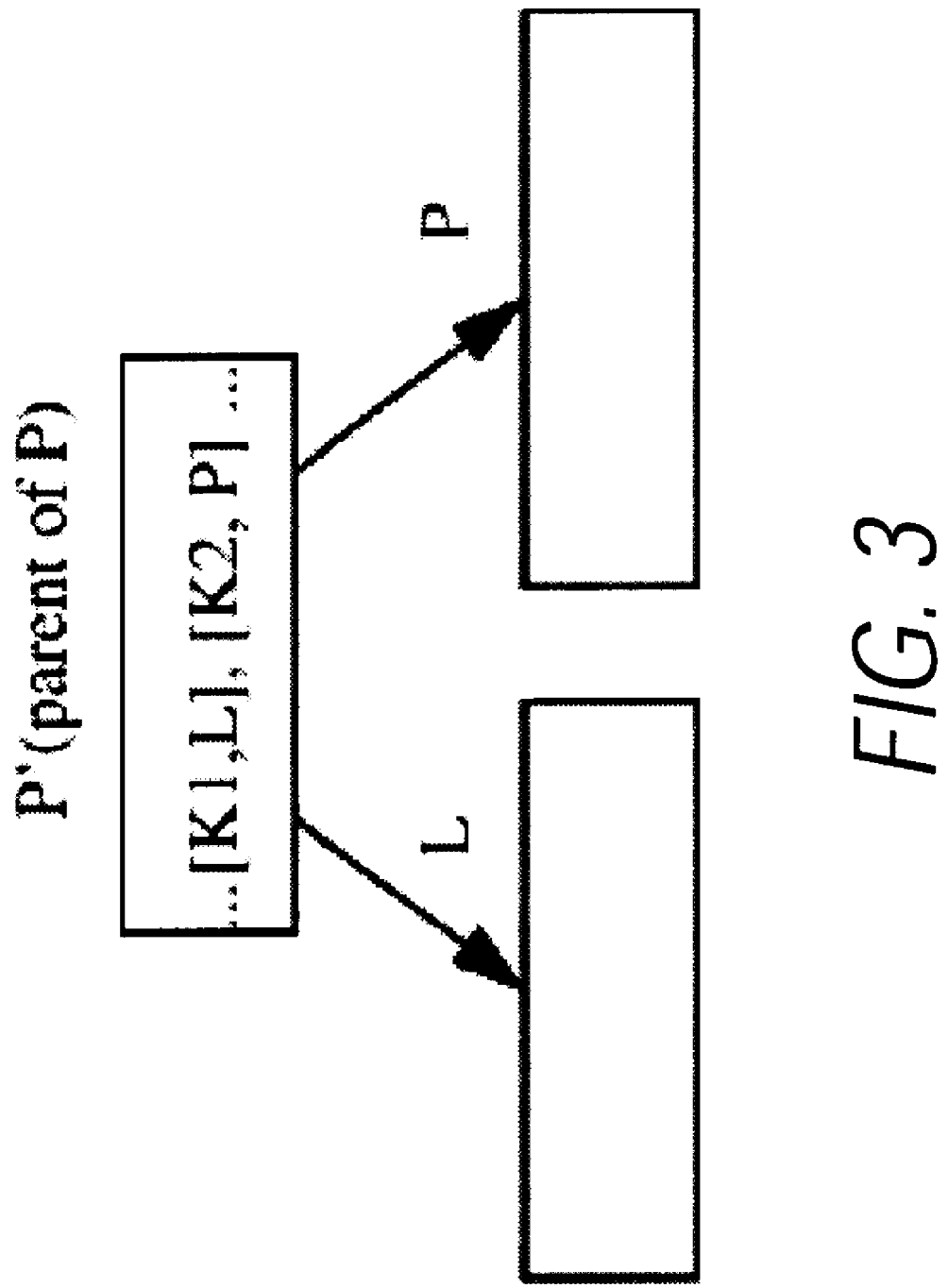
FIG. 3 is a block diagram illustrating key movement across subtrees.

Consider key movement across subtrees, as illustrated in FIG. 3. P' is the parent of P and L is the left sibling of P. [K1, L] and [K2, P] are the entries for L and P in P'. Consider some key movement from the sub-tree under P to the subtree under L. If keys up to (but not including) K are moved to the subtree under L, then the entry for P in P' needs to be changed from [K2, P] to [K, P] to keep the index consistent. So P needs to pass an UPDATE propagation entry [K, P] to P'. Now consider how to detect such key movement and how to find the value of K.

Let $C_0, C_1, \ldots, C_n$ be the children of P. If $C_0$ did not pass DELETE or UPDATE propagation entry, then no key movement has occurred from the subtree under P to the subtree under L. Otherwise, let $C_i$, where $0<=i<=n$, be the leftmost child of P that did not pass DELETE propagation entry. (Such a child must exist. Else, all children must have passed DELETE propagation entries and it is the shrink case discussed above). Since the children $C_0, C_1, \ldots, C_{i-1}$ have passed DELETE propagation entries, it means all the keys in the subtrees under them have been moved and they have become empty. The entries for all of them on P need to be deleted and $C_i$ needs to become the first child of P. If $C_i$ has passed an UPDATE propagation entry, say $[K_u, C_i]$, then keys $<K_u$ may have been moved from subtree under $C_i$ to that under its left sibling. So, P passes UPDATE propagation entry $[K_u, P]$ i.e., $K = K_u$. Otherwise, $C_i$ must have passed INSERT propagation entry(s) or no propagation entries. In either case, no key movement has occurred from the subtree under $C_i$ to a subtree under its left sibling. If $[K_i, C_i]$ is the entry for $C_i$ on P, then P passes UPDATE propagation entry $[K_i, P]$ to its parent i.e., $K=K_i$.

Propagation From Level i to Level i+1

(a) Methodology

A method of the present invention to apply a list of propagation entries passed from level i to level i+1 may be constructed as follows.

Propagate_to_level

Input: List $L=[E_1, E, \ldots, E_m]$ of all propagation entries to be applied to level i+1 pages (these were passed from level i pages)

Output: List $L_1$ of propagation entries passed to the next higher level from level i+1 if any Side Effect: The modifications specified by the input propagation entries are applied on level i+1 pages

```
propagate_to_level (L, i+1)
Initialize L 1 to empty list;
while (L is not empty)
{
    e = first propagation entry in L;
    C = page that propagated e;
    K = Any key from page C;
    /* Get the parent of C X latched. Note that
    ** traversal uses same strategy as described in
    ** retraversal section earlier to avoid starting
    ** from root (See below)
    */
    P = traverse (K, writer, i+1);
    /* identify all the propagation entries that
    ** were sent by children of P (they are
    ** guaranteed to be contiguous in L).
    */
    e' = last propagation entry in L that was
    passed by a child of P;
    Delete propagation entries e through e'
    from L;
    /* apply the propagation entries e through
    ** e' on P(See below).
    */
    Modify P;
    Append the propagation entries passed by P
    if any to L 1
    Release any latches held;
}
```

(b) Modification of Page P

The propagation entries passed by the children of P are applied on page P in two phases, the delete phase followed by the insert phase. In the delete phase, the index entries for all the children that passed DELETE or UPDATE status are deleted. All such index entries will be contiguous. In the insert phase, the index entries specified by the INSERT/UPDATE propagation entries coming from children of P are inserted. The index entries inserted will also be contiguous.

Traversal would have retrieved page P latched in X mode. However, latch alone is not sufficient. The address locking mechanism used by split or shrink top actions is used here and the SPLIT and SHRINK bits are overloaded. P is locked in X mode. A SHRINK bit is set on P if traversals through P need to be blocked. If modifications to P need to be blocked but not the traversals through P, a SPLIT bit is set on it. The rules for deciding which bit needs to be set are as follows.

If any delete is performed on a page (i.e., at least one child passed a DELETE or UPDATE status), SHRINK bit is set.

If only inserts are performed on a page (i.e., no deletes and no splits), then SPLIT bit is set.

If P needs to be split, a SHRINK bit is set on it. The new page is also X locked and SHRINK bit is set on it.

There is no need to establish a side entry as traversals through P are being blocked anyway. X latch needs to be retained only on the page where the rest of the inserts in the insert phase need to be performed. These rules are very conservative. Traversals are being allowed through the page only in the insert-only case, as no keys in the subtree under the page would have been moved to the subtree under its left or right sibling in that case. (See below for a possible improvement).

6. Reorganizing Level 1 Pages

Consider the propagation from leaf level to level 1. In the propagation methodology described above, while applying propagation entries on a level 1 page P, the insert phase inserts the index entries specified in UPDATE/INSERT propagation entries sent by the children of P. However, it is better to perform as many of those inserts as permitted by space on the immediate left sibling of P that is not being shrunk in the current top action. Note that this can only be done if the first child of P is getting deleted in the delete phase (i.e., it passed a DELETE[UPDATE status). Otherwise, it would violate the index key ordering at level 1. With this enhancement, level 1 pages are filled as much as possible without requiring a separate pass.

Figure 4:
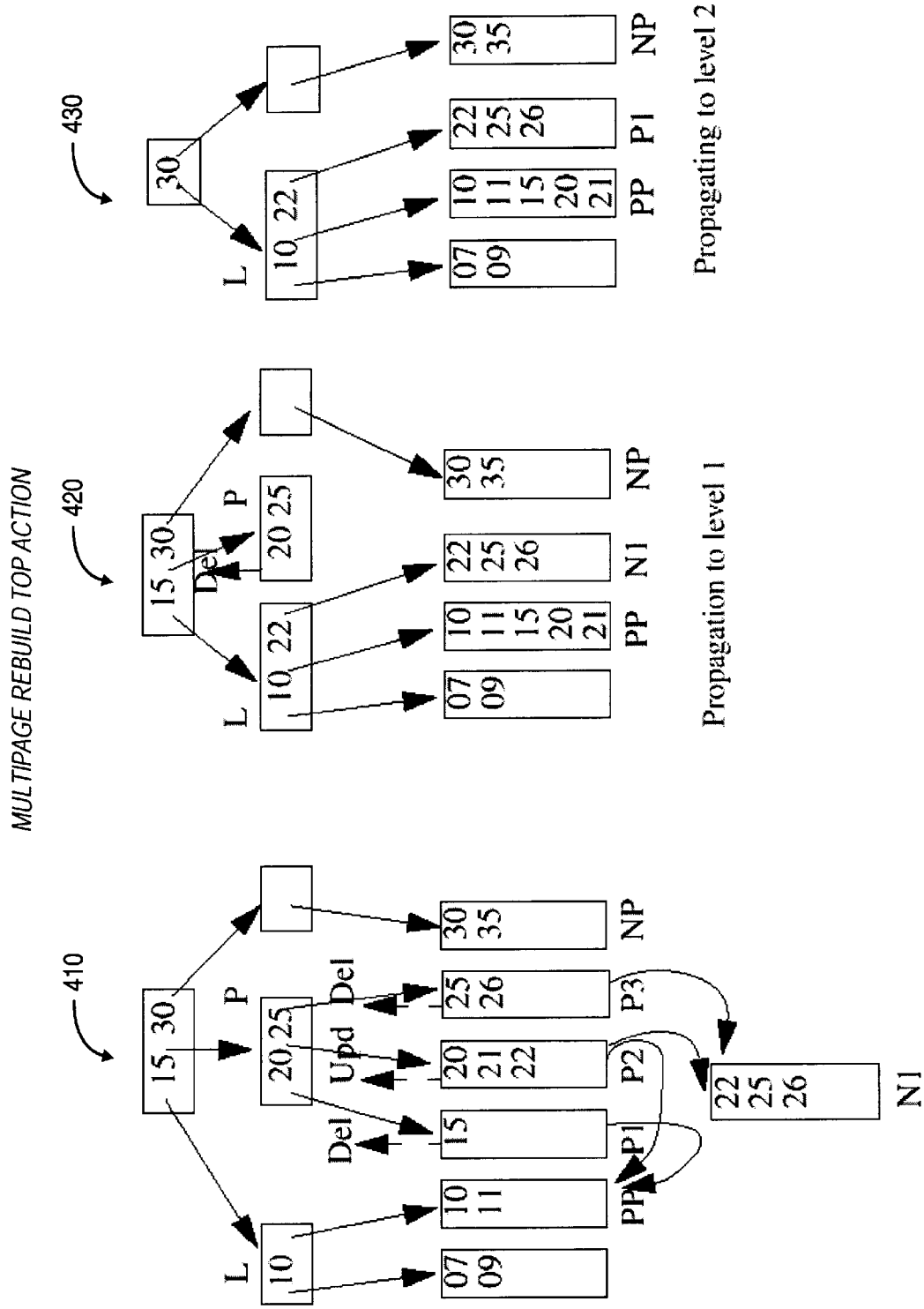
FIG. 4 is a block diagram providing an example of multipage rebuild top action, performed in accordance with the present invention.

An example of multipage rebuild top action with this enhancement is shown in FIG. 4. At propagation stage 410, Leaf pages P1, P2 and P3 are reorganized. Assuming five rows fit into a leaf page, all of P1's rows and some of P2's rows are moved to PP. The remaining rows from P2 are moved to the new page N1. All of P3's rows are moved to N1. P1 passes a DELETE propagation entry as it did not cause allocations. P2 passes UPDATE propagation entry with [22, N1] as the index entry to replace the entry for P2 at the next higher level. P3 also passes DELETE propagation entry. At propagation stage 420, the three reorganized pages P1, P2, P3 all have the same parent P. In the delete phase, the entries for all these pages need to be deleted. In the insert phase, [22,N1] needs to be inserted. However, this insert is performed on the previous page L. Since all the entries in P need to be deleted and there are no inserts to perform on P, DELETE propagation entry is passed. At propagation stage 430, the entry [15, P] is deleted. The propagation is complete and the top action is committed.

F. Propagation Phase of Rebuild

The following evaluates the methodology with respect to some relevant metrics.

1. Restoration of Clustering

When online index rebuild begins, the page manager tries to allocate a new page from a chunk of large contiguous free disk space. After all the pages in the chunk are used up, ita gain looks for a chunk of large contiguous free disk space. As the index keys are moved to the newly allocated pages in the increasing key order, the new leaf pages are expected to be well clustered.

2. Concurrency

Although rebuilding multiple pages in a top action has the disadvantage of keeping many leaf pages locked at a given time, it significantly reduces the number of visits to a level 1 page and the total duration of exclusive access to it. It also significantly reduces the CPU time for the rebuild operation which in turn reduces the negative impact of the operation on the throughput of the system. Some possible enhancements to reduce the impact on concurrent index operations include the following.

In the propagation phase, setting SHRINK bit on all nonleaf pages on which a delete was performed is pessimistic. Rebuild deletes contiguous index entries on nonleaf pages. Suppose that all index entries between $[K_i, C_i]$ and $[K_j, C_j]$ are deleted. There is no reason to block traversals through the page that are looking for $<K_i$ or $>=K_j$. Thus the positions of these index entries could possibly be established on the page (just as a split establishes a side entry) to benefit concurrent traversals. This enhancement only helps in those cases where the propagation continues above level 1.

Consider the rebuild of $P_1, P_2, \ldots, P_n$ in a single top action. Let PP be the previous page of $P_1$ and NP be the previous page of $P_n$. As the address locks are acquired on the pages being rebuilt, SPLIT bits (rather than the SHRINK bits) could be set on them (except on PP) so that only writers are blocked and not the readers. Once the contents of all the n pages have been copied to PP and possibly one or more newly allocated pages, the SPLIT bits could be modified to SHRINK bits (under an X latch). Now the next page pointer of PP and previous page pointer of NP can be set so that the old pages are effectively unlinked and new pages are linked into the chain.

3. Disk I/O

One scan of the old index is performed in the page chain order and the new pages are written out to disk once. While the page size is 2 KB, the buffer manager allows the user to configure buffer pools with 4K, 8K or 16K buffer sizes. Online rebuild requests buffer manager to use the largest size buffers available for reading old pages and for writing new pages to reduce disk I/O.

4. Logging and CPU Time

How the log space used and the CPU time consumed vary with "ntasize" was tested under the following conditions:

The space utilization in the index being rebuilt is about 50% and the rebuild specified a fillfactor of 100%.

The cache is cold (i.e. all pages had to be read from disk).

The page size is 2 KB but the buffer pool is configured with 16 KB buffers so that 16KB I/O size is used for index page reads and writes as well as log writes.

Sun Ultra-SPARC machine running SunOS 5.6 is used. For a given number of leaf pages in the old and the new index, the log space required varies primarily with the average nonleaf row size. The index manager in ASE uses suffix compression which reduces the nonleaf row size especially when the index is on multiple columns or on wide columns. Experimentation with index key size (i.e., sum of maximum column lengths of all index columns) of 4 bytes and 40 bytes yielded the results shown below. L ratio is the ratio of log space required when "ntasize" of 1 is used to the log space required at the specified "ntasize". "C ratio" is defined similarly for CPU time. Although the experiments were performed with 2K page sizes, the numbers for log space are expected to be valid for a wide range of page sizes. However, the ratio of log space required to that of the index size is expected to be inversely proportional to index page size. From Table 1, it is desirable to choose a large number for "ntasize" (e.g., 32 to 64 pages).

TABLE 1

LOG SPACE AND CPU TIME

| key size | avg non-leaf row size | nta-size | $L_{ratio}$ | $C_{ratio}$ |
|---|---|---|---|---|
| 1 | 10 | 32 | 7.3 | 2.4 |
| 4 | 10 | 64 | 8 | 2.4 |
| 40 | 20 | 32 | 4.9 | 3.7 |
| 40 | 20 | 64 | 5.4 | 4 |

5. Deadlocks

The concurrency control protocols employed in the system are such that the operations never get into a deadlock involving latches or address locks or both. The possible deadlock is one that involves only logical locks. The following rules ensure this While holding a latch, unconditional logical lock is never requested and an unconditional address lock is requested only on a page that is being allocated (and hence not accessible from the tree) or a page that does not have SPLIT/SHRINK bit set.

Latches are requested only in left to right order at a given level and top down order across levels.

Address locks are requested only in bottom up order across levels.

Address locks within a nonleaf level are acquired only in left to right order.

Address locks within leaf level: Shrink acquires address locks on two pages and they are acquired in right to left order. Split acquires address lock on the old page and then the new page. But since new page is not yet part of the tree, this sequence does not cause a deadlock with shrink. Rebuild acquires address locks in left to right order. However, as mentioned before, if rebuild needs to wait, it releases all the locks that are acquired already before waiting. After wakeup, it retries for all the locks again.

G. Advantages Over Other Online Rebuild Approaches

An early published article on online rebuild is from Tandem; see, e.g., Smith, G., *Online Reorganization of Key-Sequenced Tables and Files*, Tandem Systems Review, October 1990, the disclosure of which is hereby incorporated by reference. The approach of the present invention has the following advantages over that approach. In Tandem's approach, when the page split and merge operations are performed, the entire file is made inaccessible to the OLTP transactions, whereas in the method of the present invention only access to the affected pages is restricted. Further, in Tandem's approach, although it is not explicitly stated, it seems all the moved keys are logged where as in our approach the key contents themselves are not logged.

A more-recently published work in this area is Sockut, G. et al., *A Method for On-Line Reorganization of a Database*, IBM Systems Journal, Vol. 36, No. 3, pages 411–436, 1997 (e.g., at //www.research.ibm.com/jour-nal/sj/363/sockut.html), the disclosure of which is hereby incorporated by reference. This paper describes a comprehensive scheme to reorganize a table and rebuild the associated indexes. That scheme has several drawbacks. A separate copy of the table is made and the associated indexes are rebuilt thereby doubling the storage requirement. User transactions must be directed to use the new copy. If there are long-running user sessions (with opened cursors), reorg (operation) waits for them to complete. For the duration of the reorg, the log should not be truncated because the reorg relies on the log for any changes that need to be applied to the new copy. Incremental reorganization is difficult. By doing inline reorganization, the approach of the present invention avoids the above problems.

Zou et al. also describe an approach for rebuilding an index, see e.g., Zou, C. et al., *On-line Reorganization of Sparsely-populated B+trees*, Proc. of ACM SIG-MOD Conf, pages 115–124, 1996, the disclosure of which is hereby incorporated by reference. The present invention has the following advantages over that approach. The approach of the present invention reorganizes level 1 pages without requiring a sidefile. The sidefile mechanism adds a lot of implementation complexity. It also adds overhead to splits and shrinks happening in the index during the rebuild of non-leaf levels. Logging is reduced in Zou et al. by assuming "careful writing" mechanism in the buffer manager. The approach of the present invention does not require such a mechanism in the buffer manager. The system of the present invention and just assumes "forced write", which is different from "careful writing"; the former just requests the buffer manager to force a page to disk, while the latter assumes a more involved mechanism of tracking the relative order in which a certain set of pages need to be written to disk. Unlike Zou et al., the approach of the present invention does only one pass of the index. Also in Zou et al., only one new page is rebuilt in each reorganization unit. However, it is believed that it is important to build multiple new pages in each reorganization unit to reduce logging overhead and CPU time. In Zou et al. switching to the new B+-tree requires an X lock on the tree which may cause unbounded wait. It is suggested that the transactions active in the tree be aborted if lock cannot be acquired after certain timeout interval. User transactions are never aborted in the approach of the present invention.

However, the method of the present invention may incur the following drawbacks when compared to Zou et al. During the propagation phase of multipage rebuild, pages above level 1 may need to be modified in which case X lock is acquired on the page being modified. Zou et al. does not X lock pages above level 1 in X mode (except for the X lock on the tree in the switching phase). However, since propagation is bottom up (as opposed to top down), the duration of X lock on non-leaf pages is expected to be small. This is because most of the time in the top-action is spent in reading old leaf pages and moving rows from old leaf pages to new pages. Additionally, as mentioned before, to achieve good clustering, the approach of the present invention employs a large chunk of contiguous free space on disk to begin with. However, since the amount of contiguous free space needed is small compared to the size of the index, this is not a significant problem. At the end of each transaction, new pages need to be flushed to disk. This disadvantage is alleviated to some extent by using large buffers and building a few hundred new pages in each transaction.

H. Conclusion

The online index rebuild methodology of the present invention provides high concurrency, does minimal logging, and has good performance. By rebuilding multiple leaf pages in each top action, the updates to level 1 pages can be batched resulting in significant reduction in logging and CPU time. The level 1 pages are reorganized while propagating the leaf level changes thereby eliminating a separate pass for reorganizing level 1 pages. Moreover, as the rebuilding is performed online, the table is available for updates.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a database system, said database system storing a plurality of data records as a data table having an index, said index including a B-Tree comprising a multi-level structure having leaf-level and nonleaf-level pages for facilitating access to the database table according to a particular key order, a method for rebuilding the index comprising:

(a) receiving a request for online rebuilding of the index; and (b) rebuilding the index online by:
        (i) allocating new pages for storing index pages;
        (ii) rebuilding the leaf-level pages by copying information, in key order, from the leaf pages to the new pages;
        (iii) propagating the rebuilding of the leaf-level pages to higher nonleaf-level pages of the index; and
        (iv) reorganizing the nonleaf-level pages that are at a level directly above the leaf-level pages while propagating the rebuilding of the leaf-level pages, so as to eliminate a separate pass for reorganizing pages of that level.

2. The method of claim 1, wherein said B-Tree index comprises a B+-tree index.

3. The method of claim 1, wherein said B-Tree index comprises a plurality of pages storing a fixed number of key values derived from said data records.

4. The method of claim 1, wherein each B-Tree index comprises a root node, a plurality of internal nodes, and a plurality of leaf nodes.

5. The method of claim 4, wherein said B-Tree index comprises a clustered index, and wherein said leaf nodes of said B-Tree store said plurality of data records.

6. The method of claim 4, wherein said leaf nodes of said B-Tree store record identifiers, each record identifier uniquely identifying a particular one of said data records.

7. The method of claim 1, wherein the leaf pages of the index are doubly linked.

8. The method of claim 1, wherein multiple leaf pages are rebuilt in a single top action.

9. The method of claim 8, wherein the number of leaf pages to be rebuilt in a single top action is configurable.

10. The method of claim 1, wherein multiple leaf pages are rebuilt in a single transaction.

11. The method of claim 1, wherein the number of leaf pages to be rebuilt in a single transaction is configurable.

12. The method of claim 1, wherein said copying of information in key order includes acquiring selected ones of exclusive and shared locks on the leaf pages to be copied.

13. The method of claim 12, wherein said copying of information includes copying information only from leaf pages on which exclusive locks are acquired.

14. The method of claim 1, wherein said copying of information in key order further comprises:

generating a single log record of all key copying that has occurred.

15. The method of claim 14, in which said log record includes source page number, target page number, position of first key copied, and position of last key copied.

16. The method of claim 1, wherein said copying of information further comprises:

generating allocation and deallocation log records and a previous link log record.

17. The method of claim 1, further comprising:

writing the new pages generated by said index rebuilding to persistent storage; and after said new pages are written to persistent storage, making the old pages available for fresh allocations.

18. The method of claim 17, wherein said step of making said old pages available for fresh allocations includes the substeps of:

first deallocating a page and logging a deallocation record; and after index rebuilding completes, scanning said deallocation log record and making available for fresh allocations the dellocated pages included in said index rebuilding.

19. The method of claim 1, wherein said step of propagating the rebuilding of the leaf-level pages to higher nonleaf-level pages of the index comprises the substeps of:
deleting entries for old leaf pages in said higher nonleaf-level pages; and
inserting entries for the new leaf pages in said higher nonleaf-level pages.

20. The method of claim 19, wherein said insertions and deletions are made by an update operation specifying an entry to replace an existing entry.

21. The method of claim 19, wherein all deletions to said nonleaf pages are made before any insertions are made.

22. The method of claim 19, wherein all index deletions are in contiguous key order.

23. The method of claim 19, wherein all index insertions are in contiguous key order.

24. The method of claim 19, wherein all insertions and deletions to pages at the current level are completed before any insertions or deletions are made to index pages at a higher level.

25. The method of claim 19, wherein log records are made listing all deletions from and insertions to each affected nonleaf-level page.

26. The method of claim 25, wherein for each affected nonleaf-level page no more than one log record is made of all deletions and no more than one log record is made of all insertions.

27. The method of claim 19, wherein said step of deleting entries for old leaf pages in said higher nonleaf-level pages includes deallocating all nonleaf-level pages from which all leaf page entries have been deleted.

28. The method of claim 19, wherein said step of inserting entries for new leaf pages in said higher-level nonleaf pages includes propagating a split of said higher-level nonleaf pages as necessary to incorporate said inserting entries.

29. The method of claim 28, wherein said propagating a split of said higher-level nonleaf pages comprises propagating all remaining inserts to one or more newly propagated pages.

30. The method of claim 28, wherein said propagating a split of said higher-level nonleaf pages comprises propagating all remaining inserts to an existing page.

31. The method of claim 1, wherein said propagating the rebuilding of the leaf-level pages to higher nonleaf-level pages includes propagating from nonleaf-level pages immediately above the leaf-level pages to higher nonleaf-level pages.

32. The method of claim 31, wherein said propagation to higher nonleaf-level pages proceeds from the leaf-level pages up the index tree from lower-level to higher-level pages.

33. The method of claim 32, wherein said propagation up the index tree includes, for each lower-level page for which a delete, insert, or update entry is made, propagating an update entry to the higher-level page that is the parent of said lower-level page.

34. The method of claim 32, wherein for each said level of higher-level pages that are updated, corresponding updates are also propagated to higher-level pages that are their parents.

35. The method of claim 1, wherein said reorganization of nonleaf-level pages includes, for each nonleaf-level page having its first child index entry deleted or updated, the substeps of:
inserting as many of the remaining successive index insert or update entries in key order into the immediate left sibling of such page as permitted by space available on such left sibling page, provided said left sibling page is not being shrunk;
if there are any remaining index entries after insertion of entries into said left sibling page, including said remaining entries in key order on said nonleaf page; and
otherwise, if there are no remaining index entries on said nonleaf page, propagating a delete entry to the parent of said nonleaf page.

36. A data processing system comprising:
a database server connected to at least one client, said database server storing a database table having a multi-column index, said multi-column index comprising a B-Tree index on one or more column(s) of said database table; and
a module for rebuilding said B-Tree index including program logic for:
(i) allocating new pages for storing index pages;
(ii) rebuilding the leaf-level pages by copying information, in key order, from the leaf pages to the new pages;
(iii) propagating the rebuilding of the leaf-level pages to higher nonleaf-level pages of the index; and
(iv) reorganizing the nonleaf-level pages that are at a level directly above the leaf-level pages while propagating the rebuilding of the leaf-level pages so as to eliminate a separate pass for reordering pages of that level.

37. The system of claim 36, wherein said B-Tree index comprises a B+-tree index.

38. The system of claim 36, wherein each B-Tree index entry comprises an index key value plus a record identifier.

39. The system of claim 36, wherein said B-Tree index comprises a plurality of pages storing a fixed number of key values derived from said column(s).

40. The system of claim 36, wherein each B-Tree index comprises a root node, a plurality of internal nodes, and a plurality of leaf nodes.

41. The system of claim 40, wherein said B-Tree index comprises a clustered index, and wherein said leaf nodes of said B-Tree store said plurality of data records.

42. The system of claim 40, wherein said leaf nodes of said B-Tree store record identifiers, each record identifier uniquely identifying a particular one of said data records.

43. The system of claim 40, wherein said leaf pages of the index are doubly linked.

44. The system of claim 36, wherein the number of leaf pages to be rebuilt in a single top action is configurable.

45. The system of claim 36, wherein the number of leaf pages to be rebuilt in a single transaction is configurable.

46. The system of claim 36, wherein said copying of information in key order includes acquiring a selected one of exclusive or shared locks on the leaf pages to be copied.

47. The system of claim 36, wherein said copying of information in key order further comprises generating a single log record of all key copying that has occurred.

48. The system of claim 36, wherein said copying of information further comprises generating allocation and deallocation log records and a change previous link log record.

49. The system of claim 36, wherein said copying of information includes:
writing the new pages generated by said index rebuilding action to said database server; and
after said new pages are written to said database server, making the old pages available for fresh allocations.

50. The system claim 49, wherein making said old pages available for fresh allocations includes:
- first deallocating a page and logging a deallocation record; and
- after the rebuild action completes, scanning said deallocation log record and making available for fresh allocations the dellocated pages included in said rebuild action.

51. The system of claim 36, wherein said propogating the rebuilding of the leaf-level pages to higher nonleaf-level pages of the index comprises:
- deleting entries for old leaf pages in said higher nonleaf-level pages; and
- inserting entries for the new leaf pages in said higher nonleaf-level pages.

52. The system of claim 51, wherein said insertions and deletions are made by an update operation specifying an entry to replace an existing entry.

53. The system of claim 51, wherein all deletions to said nonleaf pages are made before any insertions are made.

54. The system of claim 51, wherein all index deletions are made in contiguous key order.

55. The system of claim 51, wherein all index insertions are made in contiguous key order.

56. The system of claim 51, wherein all insertions and deletions to pages at the current level are completed before any insertions or deletions are made to index pages at a higher level.

57. The system of claim 51, wherein log records are made listing all deletions from and insertions to each affected nonleaf-level page.

58. The system of claim 57, wherein for each affected nonleaf-level page no more than one log record is made of all deletions and no more than one log record is made of all insertions.

59. The system of claim 51, wherein said deleting entries for old leaf pages in said higher nonleaf-level pages includes deallocating all nonleaf-level pages from which all leaf page entries have been deleted.

60. The system of claim 51, wherein when said inserting entries for new leaf pages in said higher-level nonleaf pages causes includes propagating a split of said higher-level nonleaf pages as necessary to incorporate said inserting entries.

61. The system of claim 60, wherein said propagating a split of said higher-level nonleaf pages comprises propagating all remaining inserts to one or more newly propagated pages.

62. The system of claim 60, wherein said propagating a split of said higher-level nonleaf pages comprises propagating all remaining inserts to the existing.

63. The system of claim 36, wherein said propagating the rebuilding of the leaf-level pages to higher nonleaf-level pages includes propagation from nonleaf-level pages immediately above the leaf-level pages to higher nonleaf-level pages.

64. The system of claim 36, wherein said propagation to higher nonleaf-level pages is generated from the leaf-level pages up the index tree from lower-level pages to higher-level pages.

65. The system of claim 64, wherein said propagation up the index tree to higher-level pages includes, for each lower-level page for which a delete, insert or update entry is made, propagating an update entry to the higher-level page that is the parent of said lower-level page.

66. The system of claim 36, wherein for each said level of higher-level pages that are updated, corresponding updates are also propagated to higher-level pages that are their parents.

67. The system of claim 36, wherein said reorganization of nonleaf-level pages includes, for each nonleaf-level page having its first child index entry deleted or updated:
- inserting as many of the remaining successive index insert or update entries in key order into the immediate left sibling of such page as permitted by space available on such left sibling page, and provided said left sibling page is not being shrunk;
- if there are any remaining index entries after insertion of entries into said left sibling page, including said remaining entries in key order on said nonleaf page; and
- otherwise, if there are no remaining index entries on said nonleaf page, propagating a delete entry to the parent of said nonleaf page.

* * * * *